United States Patent [19]

Hongu et al.

[11] 4,198,650

[45] Apr. 15, 1980

[54] CAPACITIVE-TYPE NONLINEAR EMPHASIS CIRCUIT

[75] Inventors: Masayuki Hongu, Komae; Takeshi Hamada; Kazuo Yamagiwa, both of Tokyo, all of Japan

[73] Assignee: Sony Corporation, Tokyo, Japan

[21] Appl. No.: 825,170

[22] Filed: Aug. 16, 1977

[30] Foreign Application Priority Data

Aug. 25, 1976 [JP] Japan .................. 51-101286

[51] Int. Cl.² .......... H04N 5/76; H04N 5/21; G11B 5/02; G11B 5/04
[52] U.S. Cl. .......................... 358/8; 358/167; 360/25; 360/30; 360/33; 455/43
[58] Field of Search ............. 358/160, 166, 167, 6, 358/7, 11, 36, 37, 21, 418; 360/25, 30, 33; 325/46, 68; 328/162, 167; 333/14, 19, 28 R; 332/18, 37 R, 37 D; 330/304; 307/237

[56] References Cited

U.S. PATENT DOCUMENTS

| | | | |
|---|---|---|---|
| 3,288,930 | 11/1966 | Johnson | 358/167 X |
| 3,548,323 | 12/1970 | Gordon et al. | 328/162 X |
| 3,730,983 | 5/1973 | Numakura et al. | 358/4 |
| 3,769,612 | 10/1973 | Yamazaki | 333/14 |
| 3,795,876 | 3/1974 | Takahashi et al. | 333/14 |
| 3,798,562 | 3/1974 | Takahashi et al. | 333/14 X |
| 3,873,992 | 3/1975 | Sato et al. | 360/65 X |
| 3,918,085 | 11/1975 | Numakura et al. | 358/8 X |
| 3,978,409 | 8/1976 | Dolby et al. | 358/36 X |
| 4,012,771 | 3/1977 | Ishigaki et al. | 358/4 |

*Primary Examiner*—Robert L. Griffin
*Assistant Examiner*—Aristotelis M. Psitos
*Attorney, Agent, or Firm*—Lewis H. Eslinger; Alvin Sinderbrand

[57] ABSTRACT

A video signal processing circuit includes an amplifier with a circuit connected to it to emphasize the amplification of some frequencies relative to others. A non-linear circuit is also connected to the amplifier and comprises a capacitor connected in series with non-linear elements that change the amplification of positive and negative overshoots of the signal relative to the middle amplitude range. The result is non-linear modification of emphasis and can be used to pre-emphasize video signals before using them to modulate the frequency of a carrier and, in the playback section to de-emphasize the signals to minimize FM noise. Use of the capacitor prevents direct current from flowing and thus affecting the threshold levels of the non-linear elements. Component values can be selected to effect temperature compensation.

19 Claims, 10 Drawing Figures

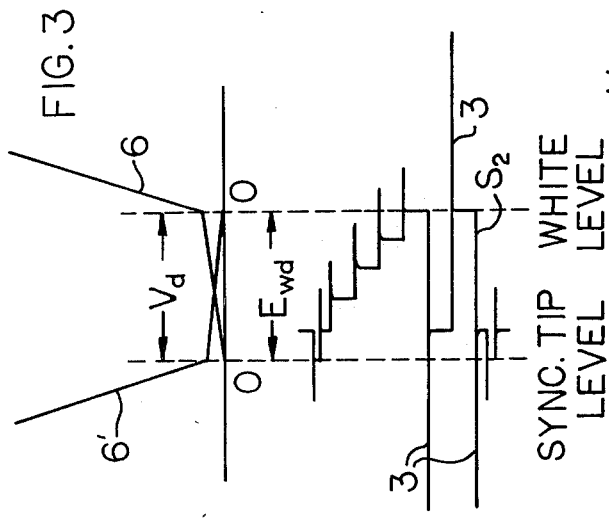
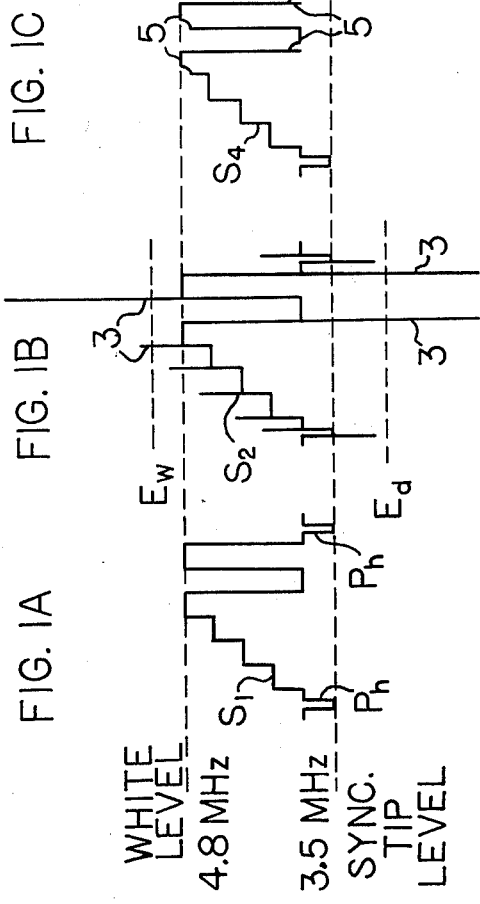
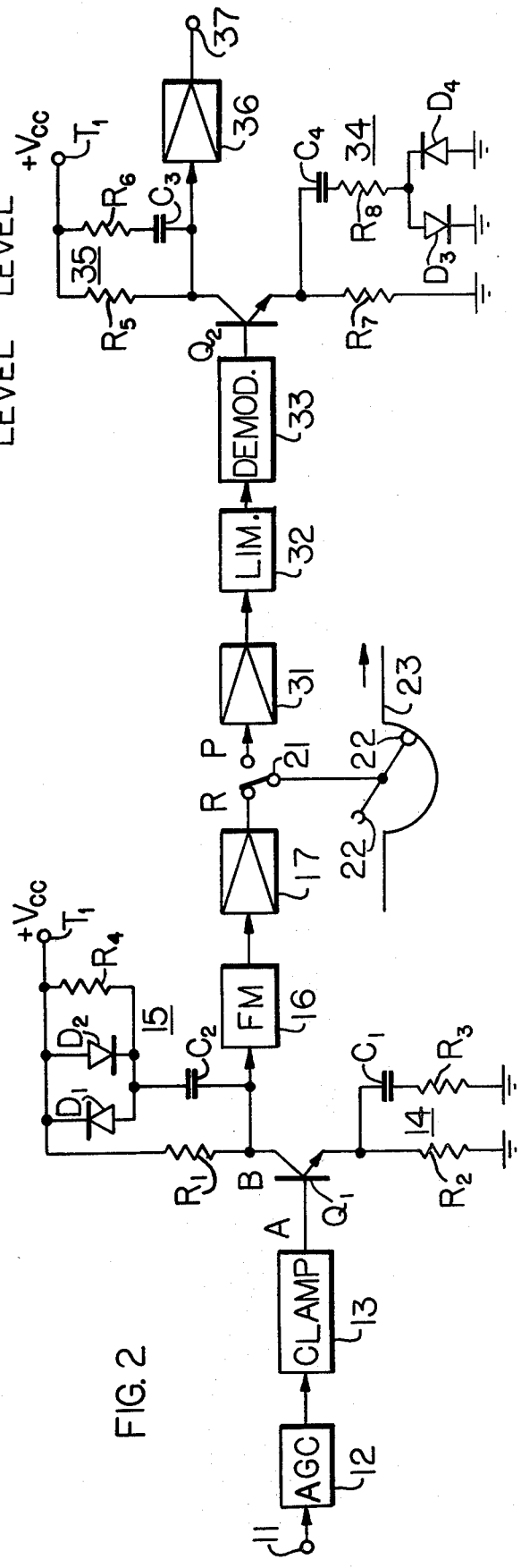

CAPACITIVE-TYPE NONLINEAR EMPHASIS CIRCUIT

BACKGROUND OF THE INVENTION

1. Field of the Invention

This invention relates generally to a video signal processing circuit that can be used to pre-emphasize high frequency components of an applied signal without allowing excessive voltage excursions of pre-emphasized frequencies and to de-emphasize high frequency components previously emphasized.

2. The Prior Art

It is well known in the art of magnetically recording and reproducing video signals to use the luminance component as a modulating signal with which to modulate the frequency of a carrier. The recording medium of such apparatus is usually, but not necessarily, magnetic tape, but for convenience of description, the apparatus with which the processing circuit of the present invention will be described will be referred to as a VTR, standing for video tape recorder and normally capable of performing both recording and playback functions.

When the VTR is operating in its playback mode, the reproduced FM signal is demodulated to become, as nearly as possible, a replica of the original video signal. It was found in the past that this reproduced video signal had a noise component caused by the frequency modulation and demodulation process and therefore referred to as FM noise, the level of which increased in proportion to the frequency. As a result, pre-enphasis circuits were included in VTRs to reduce the FM noise by emphasizing the high frequency components of the video signal prior to frequency modulating the carrier by means of that signal. In playing back the signal, a de-emphasis circuit was used to attenuate the high frequency components and thus restore the signal substantially to its original waveform while minimizing the FM noise.

It would seem that the S/N (signal-to-noise) ratio of the output signal could be improved by increasing the pre-emphasis and de-emphasis, but the frequency modulation circuits in a VTR operate in relatively narrow band in comparison to the highest frequency luminance signals to be passed through the frequency modulation process. Excessive pre-emphasis causes over modulation by means of the high frequency components, especially if the high frequency components are also of high amplitude. As a result, the amount of pre-emphasis has been limited, with the result that the S/N ratio improvement is also limited.

In a companion application entitled VIDEO SIGNAL PROCESSING CIRCUIT, Ser. No. 758,438, filed Jan. 11, 1977, assigned to the assignee of the present application, a non-linear pre-emphasis circuit was proposed in which an inductor was connected in series with the collector load of an amplifier transistor that has its emitter connected to ground. Non-linearity of response with respect to the high frequency components was accomplished by a pair of back-to-back, or oppositely polarized, diodes connected in parallel with the inductor.

A video signal applied to the base of the transistor was, in effect, differentiated by the load circuit, and the differentiated voltage, corresponding to the high frequency components of the applied video signal, was produced across the inductor. The oppositely polarized diodes had little effect on low amplitude, high frequency components but limited the voltage excursions of high frequency components as the amplitude of such components increased. Thus, the output signal at the collector of the transistor, which included the relatively low frequency components developed across the load resistor and the emphasized high frequency components added to the low frequency components was compressed only in accordance with the amplitude of the high frequency components.

Because of the fact that direct current flows through the diodes in the inductance-type circuits of the companion application, any variation in the direct voltage of the power supply or any change in temperature causes the threshold level $E_{wd}$ of the compression and expansion portions of the circuit to vary. Since the compression and expansion circuits do not operate simultaneously, such variation of voltage or temperature may not be properly compensated during playback of the recorded information.

OBJECTS AND SUMMARY OF THE INVENTION

It is one of the objects of the present invention to reduce or eliminate problems caused by direct current drift in the pre-emphasis and de-emphasis circuit.

Another object is to obtain more exact complementary operation between the compression and expansion characteristics of the overall system including both the recording and playback apparatus.

Another object of the invention is to provide greater compression of signals than has been possible with the inductance-type circuit configuration.

A further object is to compensate for variations of diode resistance due to temperature variation of the diodes in the non-linear portion of the circuit.

A still further object of the invention is to permit adjustment of the threshold level of the diodes.

Still further objects will become apparent from studying the following specification together with the accompanying drawings.

In accordance with the present invention a non-linear series circuit comprising a capacitor in series with parallel-connected, oppositely polarized diodes is connected in parallel with a load resistor of a transistor. When pre-emphasis of high frequency components is desired, as in a recording portion of a VTR at a point in the circuit preceeding the frequency modualtor, the parallel circuit comprising the load resitor and the capacitor connected in series with the oppositely polarized diodes is connected between the collector and a terminal of the power supply that provides operating power for the transistor. In the correlative de-emphasis circuit, the load resistor and parallel-connected series circuit comprising the capacitor and the oppositely polarized diodes is connected between the emitter of the transistor and another power supply terminal, which may be considered the ground terminal. As is typical in transistor circuits, the term "ground" stands for a common voltage point to which other voltages are normally referred for comparison.

The emitter and collector electrodes of the transistor may be referred to as the current-carrying electrodes. If the load resistor and the non-linear circuit connected in parallel therewith are considered to be connected to the first current-carrying electrode (which may be either the collector or emitter, as described previously), another resistor in parallel with another series circuit comprising a capacitor in series with a third resistor is connected between the second current-carrying electrode and a voltage reference point. In a pre-emphasis circuit, that voltage reference point will normally be considered to be ground and in the de-emphasis circuit it will be a power supply voltage terminal normally considered to be other than ground but effectively at ground level for alternating current components of the signal.

BRIEF DESCRIPTION OF THE DRAWINGS

FIGS. 1A–1C shows three waveforms at different points in a circuit according to the present invention.

FIG. 2 is a diagram, mostly in block form, of a VTR circuit that includes both pre-emphasis and de-emphasis circuits according to the present invention.

FIG. 3 is a graph illustrating the mode of operation of the non-linear portion of the circuit in FIG. 2.

DETAILED DESCRIPTION OF THE INVENTION

Figure 4:
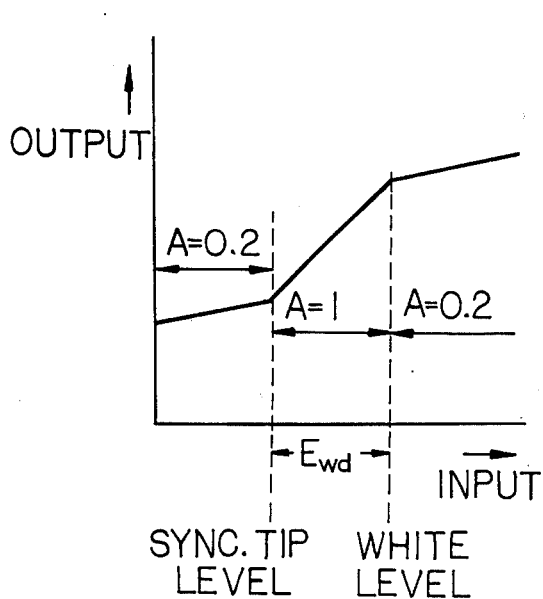
FIG. 4 is a graph illustrating the compression transfer characteristic of the circuit in FIG. 2.

FIG. 1A shows the waveform of approximately one line interval of a video signal $S_1$. This waveform includes both rapid changes in amplitude, at the sharp, vertical transitions of signal level, and unchanging amplitude at the various flat levels. The rapid changes indicate that the signal includes high frequency components, and the flat levels indicate that it includes low frequency components. The transitions from one level to the next include relatively small increments as well as large ones, and both the large and small increments include both positive-going and negative-going ones. The various flat levels are representative of low frequency components at all levels from low to high.

The signal $S_1$ is shown as occupying a range of values $E_{wd}$ between a white level, indicated by the upper horizontal dotted line, and a dark level, indicated by the lower horizontal dotted line at the level of the tips of the horizontal synchronizing signals $P_h$. The dark level is labeled 3.5 MHz, and the white level 4.8 MHz, which are the lowest and highest normal frequencies of a frequency-modulated signal in which a carrier is frequency-modulated by the signal $S_1$, as will be described hereinafter. The waveform of the signal $S_1$ can be considered as representing either a black-and-white video signal or the luminance component of a color video signal.

The circuit in FIG. 2 has an input terminal 11 connected to an automatic gain control (A.G.C.) circuit 12, the output of which is connected through a clamping circuit 13 to the base electrode of an NPN transistor $Q_1$ in an amplifying circuit that has a collector load resistor $R_1$ connected between the collector and a power supply terminal at a relatively fixed voltage $+V_{cc}$.

A circuit 14 connected to the emitter, which, with the collector, is one of the current carrying electrodes of the transistor $Q_1$, modifies the frequency response of the transistor. The modifying circuit includes a resistor $R_2$, which is connected in series between the emitter of the transistor $Q_1$ and ground, and a series circuit connected in parallel with the resistor $R_2$ and consisting of a capacitor $C_1$ connected in series with a resistor $R_3$. This circuit, connected as shown, increases the response of the transistor $Q_1$ to high frequency signals without introducing amplitude distortion and may be considered as a linear circuit that operates either as a filter or as a circuit having differentiating effect on signals amplified by the transistor $Q_1$. In short, the circuit 14 is a linear pre-emphasis circuit.

A non-linear circuit 15 which operates as a compression circuit, is connected in parallel with the resistor $R_1$ and comprises a capacitor $C_2$ connected in series with a diode circuit that includes two diodes $D_1$ and $D_2$ connected in parallel but oppositely polarized. A resistor $R_4$ is connected in parallel with the diodes $D_1$ and $D_2$ to discharge the capacitor $C_2$. The non-linear circuit 15 also has a pre-emphasis effect, but not necessarily as great as that of the linear pre-emphasis circuit 14.

The input terminal of a frequency modulator 16, which may include a carrier signal source, is connected to the collector electrode of the transistor $Q_1$, and the output of the frequency modulator circuit 16 is connected through an amplifier 17 to the recording terminal R of a switch 21. The arm of this switch is capable of connecting the terminal R to a standard VTR head comprising two transducers 22 to record information on a recording medium, such as a magnetic tape, 23. A head having one or more transducers may be used.

The arm of the switch 21 can also be moved into contact with a terminal P to play back signals previously recorded on the tape 23. In the playback mode the switch 21 connects the transducers 22 to an amplifier 31, the output of which is connected through a limiter 32 to a circuit 33 that demodulates the frequency-modulated signal. The output of the demodulator 33 is connected to the base of an NPN transistor $Q_2$ in a non-linear, expansion circuit 34. A linear de-emphasis circuit 35 is connected in the collector circuit of the transistor $Q_2$, and the output signal at the collector is connected through an amplifier 36 to an output terminal 37.

The circuit 35 is basically the converse of the linear pre-emphasis circuit 14 in that it has two resistors $R_5$ and $R_6$ and a capacitor $C_3$ connected in the same filter configuration as the resistors $R_2$ and $R_3$ and the capacitor $C_1$ in the circuit 14. However, the pre-emphasis circuit 14 is connected in the emitter circuit of the transistor $Q_1$ while the de-emphasis circuit 35 is connected so that the resistor $R_5$ is in series between the power supply terminal $T_1$ and the collector of the transistor $Q_2$.

In the same manner, the non-linear circuit 34 is the converse of the non-linear circuit 15 and expands the amplitude of the signals compressed by the circuit 15. The circuit 34 is connected in the emitter circuit of the transistor $Q_2$ and in parallel with a resistor $R_7$ connected in series between the emitter of the transistor $Q_2$ and a terminal at a relatively fixed voltage. In this instance, that terminal is the ground terminal, which means that it is the terminal with reference to which the voltages at other circuit points are normally measured. The elements in the non-linear circuit include two oppositely polarized, or back-to-back, diodes $D_3$ and $D_4$ connected in series with a resistor $R_8$ and a capacitor to form a non-linear series circuit that is directly across, or in parallel with, the resistor $R_7$.

The operation of the circuit in FIG. 2 is as follows: A video signal, such as the signal $S_1$ in FIG. 1A is applied to the input terminal 11. The amplitude of this signal is not identified in terms of voltage, as is usually the case, but in terms of the frequency band that the frequency-modulated signal from the circuit 16 should accupy when modulated by the signal $S_1$. The amplitude of the signal is corrected, if necessary, to the proper value in the A.G.C. circuit 12, and the signal, still having the waveform shown in FIG. 1A, is applied to the clamping circuit 13 which clamps the tips of the sync signals $P_h$ to a fixed voltage level. Since the amplitude of this signal has already been set by the A.G.C. circuit to the proper value, the signal as applied to the base of the transistor $Q_1$ will have both the correct amplitude and correct D-C value at the sync tips and, therefore, at every other level, including the white level. These values are measured in voltage, directly, rather than in terms of frequency, which will not be relevant until the signal has been applied to the frequency modulator circuit 16.

When the signal $S_1$ increases suddenly from the most negative value at the tip of one of the sync pulses $P_h$, the instantaneous response of the pre-emphasis circuit 14 is as if the capacitor $C_1$ were not in the circuit and the resistors $R_2$ and $R_3$ were effectively connected in parallel. As a result, the instantaneous current in the collector-emitter circuit is relatively high, producing a relatively large voltage excursion, or overshoot, across the resistor $R_1$. The capacitance of the capacitor $C_1$ and the resistance of the resistor $R_3$ are selected so that the capacitor quickly charges up. Thereafter the effective emitter resistor is simply the resistor $R_2$, which naturally has a higher resistance than the initial apparent resistance of the resistors $R_2$ and $R_3$ in parallel. This higher emitter resistance reduces the current through the resistor $R_1$ and therefore drops the voltage across the resistor $R_1$ to a lower value, where it remains for the rest of the first level step of the waveforms $S_1$. It happens that this level step is at the blanking level of the video signal $S_1$.

Each time the signal $S_1$ in FIG. 1A takes amother upward step, another short surge of current passes through the resistor $R_1$ and creates a voltage excursion of short duration. This is, in effect, the operation of a differentiating circuit, and the resultant signal waveform $S_2$ is shown in FIG. 1B as it would exist at the collector of the transistor $Q_1$ in the absence of the non-linear compression circuit 15. The waveform of the signal $S_1$ has been chosen so that each of the voltage increments is the same. Thus each of the overshoots at the leading edge of each increment in the signal $S_2$ in FIG. 1B is likewise the same, and each increment between level portions of the waveform $S_2$ in FIG. 1B is the same during the stairstep portion of that signal.

When the signal $S_2$ in FIG. 1B reaches the white level, it should not get more positive, although it, in fact, does so at the occurrence of the first overshoot 3 immediately preceeding the step that brings the signal level up to the white level. It is at this level that the non-linear compression circuit 15 begins to take effect.

The forward-biased impedance characteristics of the diodes $D_1$ and $D_2$ are approximately illustrated by the curves 6 and 6', which are drawn as broken straight lines on FIG. 3. Each of these impedance curves has a relatively high impedance section starting at its respective zero value and then changes to a lower impedance value when the voltage across the diode equals the value $V_d$, which is the voltage at the knee of the curve and is the same for each of the diodes $D_1$ and $D_2$. The range $E_{wd}$ between the maximum white level voltage and the maximum dark level voltage is chosen to be equal to the diode voltage $V_d$.

The curves 6 and 6' in FIG. 3 are shown as having apparently two zero points because of the fact that the diodes $D_1$ and $D_2$ in FIG. 2 are connected back-to-back. As long as the voltage of the collector of the transistor $Q_1$ is in the proper range $E_{wd}$, the diodes $D_1$ and $D_2$ present high effective impedances in series with the capacitor $C_2$. If the voltage at the upper plate of the capacitor $C_2$, as illustrated in FIG. 2, becomes more positive than the white level, as shown in FIG. 1B, which is equivalent to going outside the range $E_{wd}$ to the right in FIG. 3, the diode $D_1$ becomes conductive and produces the effect of a low impedance in series with the capacitor $C_2$. This has the effect of reducing the effective load impedance on the transistor $Q_1$, thereby preventing the voltage of the collector of the transistor from going any higher, or at least, from going much higher.

The magnitude of the effect of the relatively sudden transistion of the diode $D_1$ from a high impedance device to a relatively low impedance device depends upon the instantaneous impedance presented by the capacitor $C_2$. If the diode $D_1$ is indeed thought of as the equivalent of a resistor, the circuit 15 has an effect somewhat similar to that of the circuit 14 in that it responds to sudden changes of voltage toward an increasingly more positive value at the collector of the transistor $Q_1$ as if the circuit 15 were a differentiating circuit or a circuit that emphasized high frequency components. However, since the circuit 15 is connected in the collector circuit of the transistor $Q_1$, it changes the gain of the transistor $Q_1$ by reducing the ability of the transistor $Q_1$ to amplify positive-going overshoot signals by the same relative amount as the $E_{wd}$ range. The reason for compressing or clipping or limiting these overshoot signals that exceed the white level is that they would cause the frequency modulator circuit 16 to produce higher frequencies than are permissible in the system.

In a like manner, the diode $D_2$ shifts from a relatively high impedance device to a relatively low impedance device when the voltage at the collector of the transistor $Q_1$ goes beyond the lower boundry of the voltage range $E_{wd}$, which is the same as going to the left of the voltage range $E_{wd}$ in FIG. 3.

Thus, the combined effect of the trends of the diodes $D_1$ and $D_2$ is the same as if they were a single non-linear semi-conductor device that had the equivalent of a relatively high impedance for signals within the range $E_{wd}$ and relatively low impedance for signals more negative or more positive than that range. If the impedance of the diodes $D_1$ and $D_2$ is sufficiently high, and the capacitor $C_2$ cannot be sufficiently descharged by currents flowing through those diodes, the resistor $R_4$ may be included to carry discharge current for the capacitor.

The output signal of the collector of the transistor $Q_1$ is thus subjected to non-linear pre-emphasis prior to being applied to the frequency modulator 16. As previously stated, the frequency modulator 16 is arranged so that it produces a frequency-modulated signal that swings between the frequency of 3.5 MHz for signals at the level of the tips of the sync pulses $P_h$ and 4.8 MHz for signals at the white level. This frequency-modulated signal is amplified by the amplifier 17 and passed through the switch 21 to the transducers 22 to be recorded on the magnetic tape recording medium 23.

When the recorded signal is to be played back, the arm of the switch 21 is changed over to connect with the terminal P. The same transducers 22 that record signals on the tape 23 can be used to reproduce the signals and to change them back into electrical signal form. These electrical signals are applied through the terminal P of the switch P to the amplifier 31 and from the amplifier 31 through the limiter 32 to the demodulator 33 that reproduces the pre-emphasis signal $S_2$ except for the most positive and most negative peaks, which have been clipped by the compression circuit 15. This reproduced signal is then applied to the transistor $Q_2$ which operates on the signal that is essentially the signal $S_2$ in FIG. 1B to return it as nearly as possible to the form of the signal $S_1$ in FIG. 1A. Because of the clipping done in the compression circuit 15, the signal reproduced at the output of the demodulator 33 differs slightly at the points 5 as indicated in FIG. 1C. These differences are due to the loss of energy in the clipped pulses.

The gain of the transistor $Q_2$ is controlled by the expansion circuit 34, which is substantially the converse of the compression circuit 15. This circuit responds to overshoot signals by momentarily changing the gain of the transistor $Q_2$. Thus the amplitude response of the transistor $Q_2$ is non-linear because of the circuit 34, and this non-linearity is of the opposite effect to that produced by the circuit 15.

The linear de-emphasis 35 is substantially the converse of the pre-emphasis circuit 14 and, like the circuit 14, is linear in operation. As a result, the output signal at the collector of the transistor $Q_2$ is the signal $S_4$ shown in FIG. 1C and has substantially the same waveform as the signal $S_1$ shown in FIG. 1A. This signal $S_4$ is amplified by the amplifier 36 and may be taken from the output terminal 37 for further use, as is well known, in other circuits of a complete system (not shown in FIG. 2).

Figure 5:
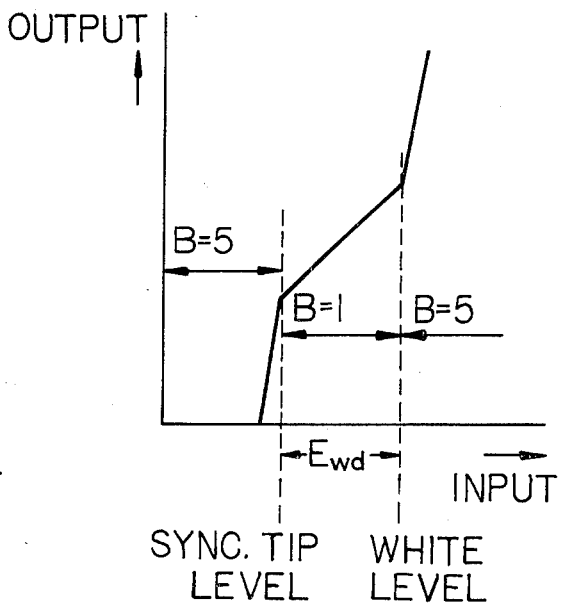
FIG. 5 is a graph illustrating the expansion transfer characteristic of the circuit in FIG. 2.

FIGS. 4 and 5 illustrate compression and expansion transfer characteristics, respectively. In FIG. 4, the gain, or transfer coefficient, A is equal to 1, within the range $E_{wd}$, but above or below that range, the transfer characteristic is only 0.2. The independent variable is the input signal and the dependent variable is the output variable. Thus, either positive or negative excursions of the input signal beyond the range $E_{wd}$ are amplified less than signals within that range.

Conversely, the expansion transfer coefficient B in FIG. 5 is greater than 1 outside the range $E_{wd}$ but is still 1 within that range. In fact, above or below the range $E_{wd}$, B=5, which is the inverse of the compression transfer characteristic A=0.2 above or below the proper range $E_{wd}$. Because of these relationships, the amplitudes of overshoots that are compressed in the circuit 15 in FIG. 2 are returned by the expansion circuit 34 to the proper relations in comparison to mid-range signals, that is, signals within the range $E_{wd}$.

Because of the capacitor $C_2$ in the compression circuit 15 and the fact that compression is in response to the whole signal at the collector of the transistor $Q_1$ and not just to the overshoot portion, as was true in the companion application Ser. No. 758,438, the non-linear pre-emphasis achieved by the transistor $Q_1$ and the circuits 14 and 15 connected thereto is greater than that obtained in the aforesaid companion application.

Figure 6:
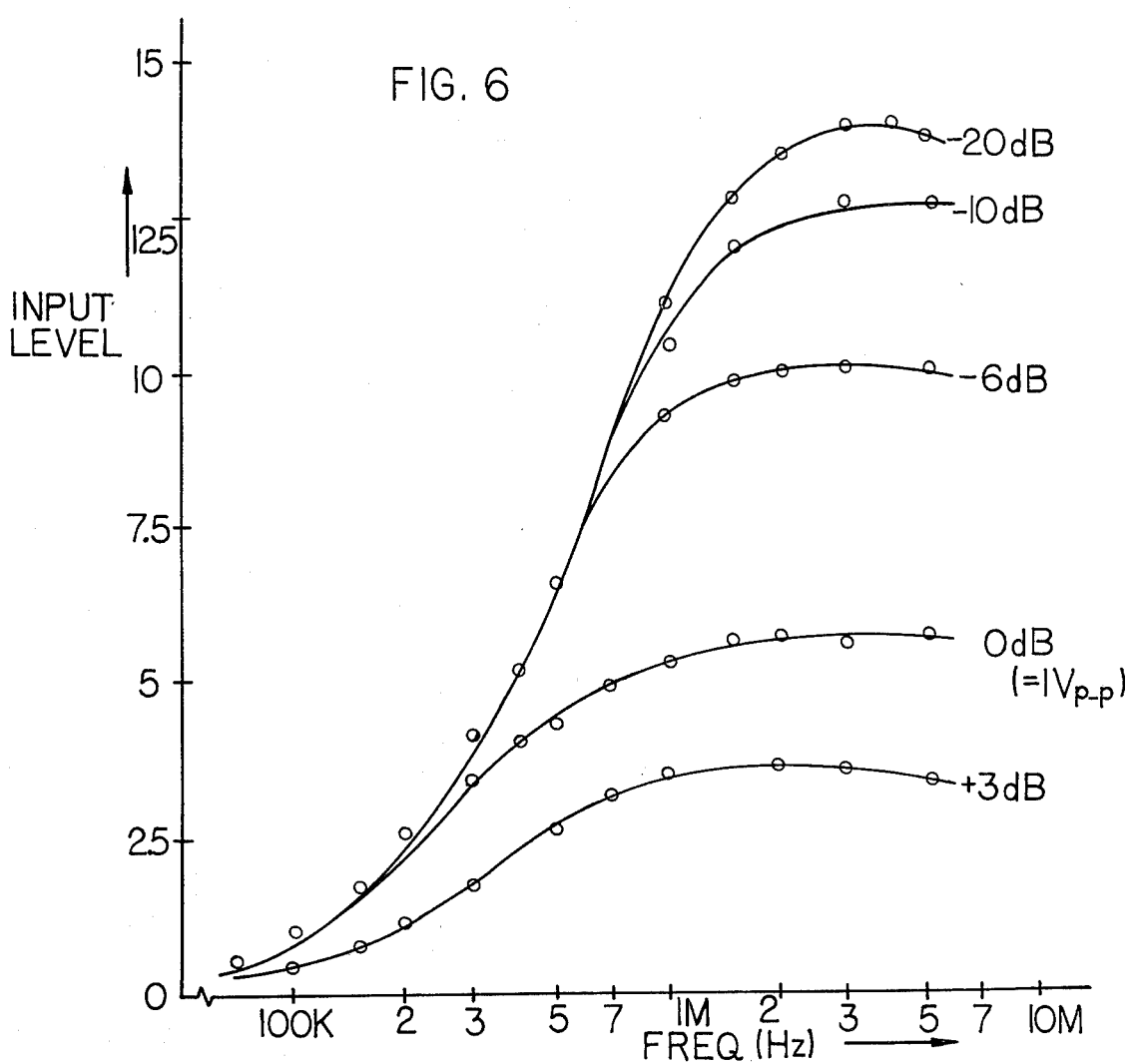
FIG. 6 is a graph for explaining the operation of the circuit in FIG. 2.

FIG. 6 is a graph of non-linear pre-emphasis obtained at the collector of the transistor $Q_1$. Of course, the converse non-linear de-emphasis is obtained by the transistor $Q_2$ and the circuits 34 and 35 associated therewith.

One of the advantages of having a capacitor in series with the diodes in the non-linear circuit, whether it is the compression circuit 15 or the expansion circuit 34, is that the threshold value of $E_{wd}$ will not vary in response to variations of the power supply voltage because direct current cannot flow through the capacitor $C_2$ or $C_4$, respectively. This helps to maintain complementary operation of the expander circuit 34 relative to the compressor circuit 15, regardless of direct current drift.

A preferred set of parameters for the circuit in FIG. 2 is as follows:

| | | | |
|---|---|---|---|
| $C_1$ | 1000pF | $R_3$ | 760Ω |
| $C_2$ | 150pF | $R_4$ | 15K |
| $C_3$ | 470pF | $R_5$ | 1.5K |
| $C_4$ | 82pF | $R_6$ | 560Ω |
| $R_1$ | 1.6K | $R_7$ | 3.9K |
| $R_2$ | 500Ω | $R_8$ | 10K |

Figure 7:
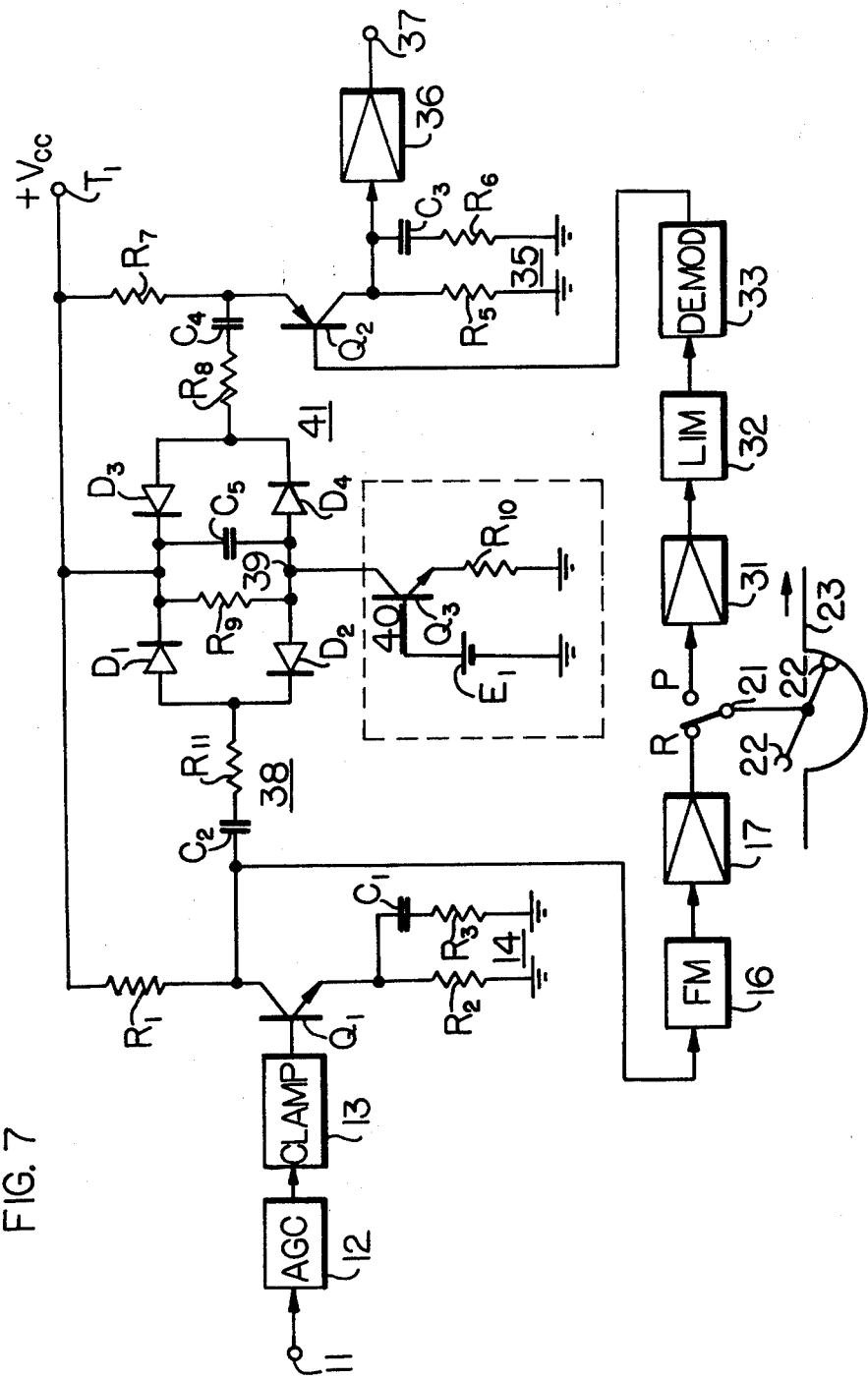
FIG. 7 is a modified embodiment of a circuit incorporating the invention.

Except for the compression and expansion circuits, the components in FIG. 7 correspond substantially to those in FIG. 2. Most of the elements are identified by the same reference numerals as the corresponding elements in FIG. 2 and operate in the same way, so that it is not necessary to describe them again in the same detail. The circuit in FIG. 7 includes the input terminal 11 connected to the A.G.C. circuit 12, the output of which is connected by way of the clamping circuit 13 to the base of the transistor $Q_1$. The linear pre-emphasis circuit 14 is also connected in the emitter circuit of the transistor $Q_1$ in FIG. 7, and the resistive load $R_1$ is connected in series with the collector of the transistor $Q_1$ in the same manner as in FIG. 2.

FIG. 7 differs from FIG. 2 in the arrangement of a non-linear circuit 38. This circuit is connected substantially in parallel with the collector load resistor $R_1$, but the non-linear circuit is different from the non-linear circuit 15 in FIG. 2. The circuit 38 includes the same capacitor $C_2$ connected in series with a resistor $R_{11}$ to the anode and cathode, respectively, of a pair of diodes $D_1$ and $D_2$, and the cathode of the diode $D_1$ is connected directly to the terminal $T_1$ at which the relatively fixed power supply voltage $V_{cc}$ is present, but, unlike circuit 15, the anode of the other diode $D_2$ is connected to what amounts to a different power supply terminal 39 at a voltage between the voltage $+V_{cc}$ and ground. This intermediate voltage terminal 39 is the common connection point of a resistor $R_9$, a capacitor $C_5$, and a constant current circuit 40. In this embodiment, the latter includes an NPN transistor $Q_3$ having its collector serving as the aforementioned common connection point and having a resistor $R_{10}$ connected between its emitter and ground. A base bias voltage source $E_1$ is connected between the base of the transistor $Q_3$ and ground to determine the level of the constant current through the transistor $Q_3$. The circuit also shows the diodes $D_3$ and $D_4$ connected in series across the resistor $R_9$, but these latter diodes are actually in the expansion circuit, which will be discussed a little later.

The collector of the transistor $Q_1$ is connected to the frequency-modulator circuit 16 and the frequency-modulated output signal of that circuit is connected through the amplifier 17 and the switch 21 to the transducers 22. These transducers record on the magnetic tape 23 signals amplified by the amplifier 17.

In the playback mode, the arm of the switch 21 is connected to the playback terminal P so that the transistors 22 are connected through the amplifier 31 and the limiter 32 to the demodulator 33 that demodulates the frequency-modulated signals. The output of the demodulator 33 is connected to the base of the transistor $Q_2$, which, in this embodiment, is a PNP transistor. The use of a PNP transistor permits some of the same circuit elements to be common to both the expansion and compression circuits and does not require provision of an additional power supply voltage. The transistor $Q_2$ has the resistor $R_7$ connected in series between its emitter and a power supply terminal at a relatively fixed voltage, which in this case, is the terminal $T_1$. Connected effectively in parallel with the resistor $R_7$ is a non-linear expansion circuit 41 including the capacitor $C_4$ connected in series with the resistor $R_8$ and the oppositely polarized diodes $D_3$ and $D_4$. The cathode of the diode $D_3$, as in FIG. 2, is connected directly to the power supply terminal $T_1$, but the anode of the diode $D_4$, like the anode of the diode $D_2$, is connected to the intermediate level power supply terminal 39.

The transistor $Q_2$ has the linear de-emphasis circuit 35 connected in its collector circuit, just as did the transistor $Q_2$ in FIG. 2. However, due to the fact that the transistor $Q_2$ in FIG. 7 is a PNP transistor, the de-emphasis circuit 35 is connected between the collector and ground rather than between the collector and the positive power supply terminal. Specifically, the resistor $R_5$, which is one of the resistors in the de-emphasis circuit 35, is connected in series between the collector of the transistor $Q_2$ and the relatively fixed voltage terminal represented by ground. The term "relatively fixed" is used because the voltages at the various terminals, such as ground and the terminals 24 and $T_1$, are not necessarily maintained at exact values but may be operated at only substantially exact values relative to each other. The collector output terminal of the transistor $Q_2$ is connected through the amplifier 36 to the output terminal 37.

The operation of the circuit in FIG. 7 need only be explained insofar as the non-linear compression circuit 38, the constant current circuit 40, and the non-linear expansion circuit 41 are concerned, since the rest of the circuit operates in the same way as the circuit in FIG. 2.

The capacitor $C_5$ has a sufficiently large capacitance to be virtually a short circuit across the resistor $R_9$ insofar as alternating voltage signals are concerned. Thus, for alternating voltages, the terminal $T_1$, the terminal 39, and ground are virtually short circuited together. A direct voltage drop is produced across the resistor $R_9$ by virtue of the constant current that flows through the transistor $Q_3$. The diodes $D_1$ and $D_2$ are connected in series and in the same polarity, so that they are polarized to be non-conductive by the direct voltage between the terminals $T_1$ and 39. In the same manner, the diodes $D_3$ and $D_4$ are connected in the same polarity in series across the resistor $R_9$ to be normally non-conductive to the direct voltage across the resistor $R_9$. Thus, the diodes $D_1$–$D_4$ do not conduct the constant current that flows through the collector-emitter circuit of the transistor $Q_3$. All of the constant direct current flows through the resistor $R_9$.

Because of the low impedance capacitor $C_5$ to AC, the diodes $D_1$ and $D_2$ are connected virtually back-to-back, and so are the diodes $D_3$ and $D_4$, which makes the operation of the compression circuit 38 similar to that of the compression circuit 15 in FIG. 2 and makes the operation of the expansion circuit 41 similar to that of the expansion circuit 34 in FIG. 2. Assuming the diodes $D_1$ and $D_2$ are identical and that the diodes $D_3$ and $D_4$ are identical, the resistors $R_{11}$ and $R_8$ are biased to a voltage midway between the voltages at the terminals $T_1$ and 39. As long as the voltage at the end of the resistor $R_{11}$ connected to the anode of the diode $D_1$ and the cathode of the diode $D_2$ remains within the high impedance portion of the characteristic curves of these diodes, there will be no compression of the signal at the collector of the transistor $Q_1$. The voltage range just defined is the range $E_{wd}$, and only when the voltage applied to the diodes $D_1$ and $D_2$ by the resistor $R_{11}$ gets out of this range will the impedance of one or the other diodes $D_1$ or $D_2$ drop, thereby limiting further voltage swing.

The voltage applied to the diodes $D_1$ and $D_2$ by the resistor $R_{11}$ is determined by the capacitor $C_2$ and by the magnitude and rate of change, or frequency, of the signal at the collector of the transistor $Q_1$. The non-linear circuit 38 is not responsive to very low frequencies, but as the frequency increases, the effective impedance of the capacitor $C_2$ drops and the diodes $D_1$ and $D_2$ produce their non-linear, or compressive effect at smaller magnitudes of voltage at the collector of the transistor $Q_1$.

The same is true of the diodes $D_3$ and $D_4$ in the expansion circuit 41. However since the non-linear elements of the expansion circuit are in the emitter circuit of the transistor $Q_2$, the limiting effect when the voltage applied to the diodes by the resistor $R_8$ exceeds the range $E_{wd}$ causes the gain of the transistor to increase.

The biasing circuit for the diodes $D_1$–$D_4$ makes it possible to compensate for variations in the diode voltage $V_d$ caused by temperature variations. Assuming the diodes $D_1$–$D_4$ are all identical, the voltage drop across the resistor $R_9$ due to the constant current $I_o$ is equal to the voltage $V_d$ of two diodes $D_1$ and $D_2$ (or $D_3$ and $D_4$) in series. It must be remembered that the voltage across the resistor $R_9$ is opposite the forward voltage polarity. Thus:

$$I_o R_9 = -2 V_d \tag{1}$$

The rate of change of $V_d$ with respect to temperature is such that $V_d$ goes down as the temperature increases. Thus:

$$-R_9/2 \cdot \Delta I_o/\Delta T = \Delta V_d/\Delta T \tag{2}$$

The voltage drop across the resistor $R_{10}$ is equal to the difference between the voltage $E_1$ and the base-emitter voltage $V_{be}$ of the transistor $Q_2$:

$$I_o R_{10} = E_1 - V_{be} \tag{3}$$

The rate of change of both sides of equation (3) with respect to temperature (keeping in mind that $E_1$ remains constant) is:

$$R_{10}(\Delta I_o/\Delta T) = -(\Delta V_{be}/\Delta T) \tag{4}$$

By selecting the proper relationship between the resistances of the resistors $R_9$ and $R_{10}$, the rate of change of $V_{be}$ with respect to temperature may be made equal and opposite to the rate of change of $V_d$ with respect to temperature. Thus:

$$-R_9/2 \cdot \Delta I_o/\Delta T = -R_{10}(\Delta I_o/\Delta T) \tag{5}$$

or $$R_9 = 2R_{10} \tag{6}$$

When the resistances of the resistors $R_9$ and $R_{10}$ are related according to Eq. (6):

$$\Delta V_{be}/\Delta T = \Delta V_d/\Delta T \tag{7}$$

Eq. (7) indicates that the change in $V_d$ due to change in the ambient temperature can be compensated by the transistor $Q_3$ and properly related values of $R_9$ and $R_{10}$.

It should also be noted that, if the voltage across the resistor $R_9$ is varied by adjustment of the bias voltage of the D-C source $E_1$, it is possible to control, or adjust, the threshold level $E_{wd}$ of the compressor circuit 15. Since the expander circuit 41 operates in the same way and with the same resistor $R_9$ and constant current source 40, the threshold level $E_{wd}$ can also be controlled in the expander circuit 41.

This form of temperature compensation by simply choosing the resistor $R_9$ to have twice as great a resistance as the resistor $R_{10}$ and by using the same circuit components for both recording and playback minimizes the problem of obtaining equal but opposite effects in the compression and expansion circuits even if the ambient temperature during recording is different from the ambient temperature during playback.

Figure 8:
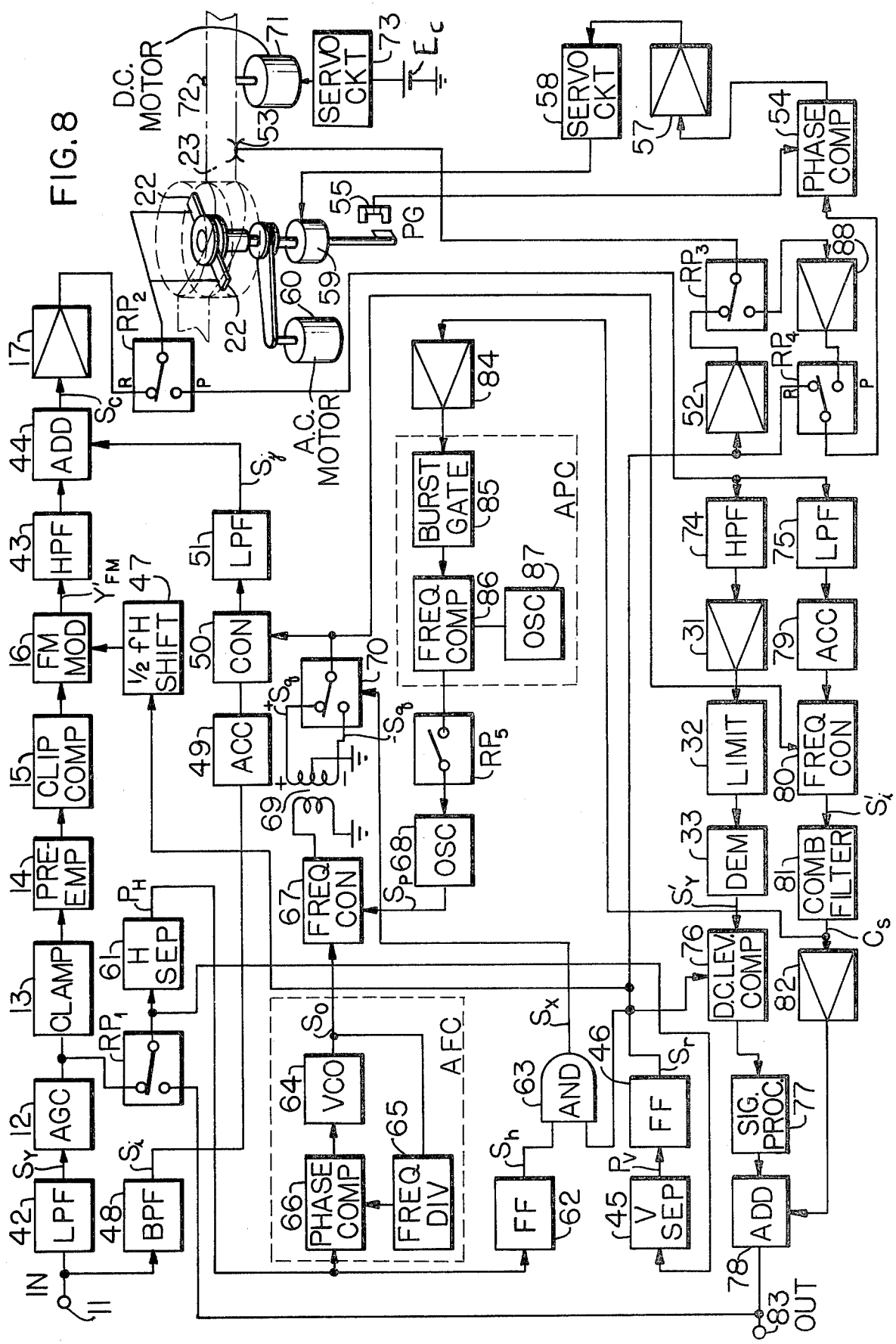
FIG. 8 is a block diagram of a video tape recorder including the features of this invention.

In the embodiments in FIGS. 2 and 7, the video signals applied to the input terminal 11 were considered only as black and white video signals or the luminance component of a color signal. FIG. 8 illustrates a complete system for recording and reproducing color video signals composed of both chrominance and luminance components, and in which circuit elements corresponding to those previously described with reference to FIGS. 2 and 7 are identified by the same reference numerals. More particularly, it will be noted that, in FIG. 8, the invention is particularly applied to the luminance component of the color video signals for eliminating the FM noise signal and the interfering signal due to cross-talk in respect to the luminance component, whereas interfering signals due to cross-talk interference of the chrominance component is eliminated by recording the chrominance component with different carriers in adjacent tracks.

In FIG. 8 an input terminal 11 receives the color video signals, which include luminance and chrominance components and are divided into line, field and frame intervals and have blanking and synchronizing portions in each of those intervals. Such color video signals are applied from terminal 11 to a low pass filter 42 which transmits substantially only the luminance component or signal $S_Y$ to an automatic gain control circuit 12. The gain-controlled luminance component from the circuit 12 is applied to a clamping circuit 13 which clamps the sync-tip level of the luminance component to a fixed reference voltage level. The clamped luminance component is passed through a pre-emphasis circuit 14 to a compressing circuit 15 and, through the latter, to a frequency modulator 16 for frequency modulating a carrier. It will be understood that the pre-emphasis circuit 14 and the compressing circuit 15 are preferably similar to the correspondingly numbered components described above with reference to FIG. 2 or FIG. 7. The frequency-modulated luminance component $Y_{FM}$ issuing from modulator 16 is passed through a high-pass filter 43 to a mixing circuit 44.

The output of A.G.C. circuit 12 is also applied through an R contact of a record-playback switch $RP_1$ connected to a vertical synchronizing signal separating circuit 45. The vertical synchronizing signals $P_v$ separated from the incoming video signals by the circuit 45 are applied to a flip-flop circuit 46 to provide a control signal $S_r$ of rectangular waveform. This signal is applied to a circuit 47 by which the carrier frequency modulated in frequency modulator 16 is shifted by $\frac{1}{2}f_H$ for successive field intervals of the video signals, as described in a companion application entitled NOISE AND CROSS-TALK ELIMINATION RECORDING AND REPRODUCING VIDEO SIGNALS, Ser. No. 812,329, assigned to the assignee of the present application.

The color video signals applied to input terminal 11 are also passed along to a band pass filter 48 that separates the chrominance component $S_i$ from the composite color video signals and passes such chrominance component through an automatic color control circuit 49 to a frequency converter 50 in which the chrominance component is converted to a frequency band lower than that of the frequency-modulated luminance component $Y'_{FM}$ supplied to the mixing circuit 44. The resulting frequency-converted component $S_j$ is supplied from the frequency converter 50 through a low-pass filter 51 to another input of the mixing circuit 44 so as to be combined in the latter with the frequency-modulated luminance component $Y'_{FM}$ to provide a composite signal $S_c$. The signal $S_c$ is applied to a recording amplifier 17, the output of which is connected by means of a recording contact R of a record-playback switch $RP_2$ to the rotary transducers 22 to record the signals on parallel slant tracks on the tape 23.

The output of flip-flop 46 is applied through an amplifier 52 to a record contact R of a record-playback switch $RP_3$ which, in its recording position, as shown, applies the resulting control signals to a fixed transducer, or head, 53 for recording by the latter at spaced apart locations along a longitudinal edge of the tape 23. It will be understood that such control signals recorded by the fixed head 53 occur in correspondence with the recording of color video signals in alternating tracks recorded on the tape so as to identify or distinguish between the tracks in which the frequency-modulated luminance component is recorded with the first or second carrier frequency and the chrominance component is recorded with first and second carriers, as hereinafter described.

The control signal $S_r$ from the flip-flop 46 is also employed in a servo system for regulating the rotary movements of the transducers 22. As shown, the control signal $S_r$ is applied to the contact of a record-playback switch $RP_4$ which, in its illustrated recording position, applies the control signal $S_r$ to one of the inputs of a phase comparator 54. Another input of the phase comparator 54 receives the rotation-indicating pulses from a pulse generator 55 associated with the axle 56 of the transducers 22. The comparator 44 compares the phases of the control signals $S_r$ from the flip-flop 46 and of the pulse signals from the generator 55 and provides a corresponding brake-control or servo signal which is passed through an amplifier 57 to a servo circuit 58 for either suitably decreasing or increasing the braking force exerted by a brake 59 acting on the axle 56. Thus, the speed at which transducers 22 are rotated by a motor 60 is regulated so that transducers 22 will commence to move along respective tracks on the tape at the commencement of alternating field intervals of the color video signals being recorded.

The gain controlled luminance component from the circuit 12 is further shown to be applied through the record-playback switch RP₁ to a horizontal synchronizing separator 61 which separates out the horizontal synchronizing signals $P_h$ for application to a flip-flop 62. The resulting rectangular waveform or control signal $S_h$ from the flip-flop 62 has successive high and low intervals, each equal to one line interval H, and is applied to one input of an AND circuit 63 which, at its other input, receives the rectangular waveform or signal $S_r$ from the flip-flop 46 having successive high and low intervals each equal to one field interval. As a result, the output, or control, signal $S_x$ from the AND circuit 63 remains low during each field interval recorded in alternate tracks and goes high only during alternate line intervals of each field interval recorded in the remaining alternate tracks. In the illustrated recording and reproducing apparatus in FIG. 8 such output, or control, signal $S_x$ from AND circuit 63 is employed for controlling the establishment of different carriers for the frequency converted chrominance component $S_j$ to be recorded in tracks that are next adjacent to each other, with such carriers differing from each other in their polarity characteristics as described in detail in U.S. Pat. Nos. 3,925,910, 4,007,482 and 4,007,484.

The circuit for frequency converting the chrominance component $S_i$ and for providing the different carriers with which the frequency converted chrominance component $S_j$ is recorded in tracks that are next adjacent each other includes a voltage controlled oscillator 64 providing an output $S_o$ with a center frequency of, for example, $44f_H$. The output $S_o$ of the oscillator 64 is applied to a frequency divider 65 to be divided in the latter by 44, and the output of the divider 65 is applied to a comparator 66 which also receives the separated horizontal synchronizing signals $P_h$ from the separator 61. It will be appreciated that comparator 66 compares the frequency of the output from the divider 65 with the frequency $f_H$ of the separated horizontal synchronizing signals $P_h$ and, upon any deviation therebetween, provides a suitable control voltage to voltage controlled oscillator 64 for automatically maintaining the output signal $S_o$ at a frequency of $44f_H$.

The signal $S_o$ is applied to a frequency converter 67 in which the signal $S_o$ is frequency-converted by a frequency-converting signal $S_p$ from a voltage controlled oscillator 68 having a center frequency of $f_i - \frac{1}{4}f_H$, in which $f_i$ is the original, or standard, carrier frequency of the chrominance component $S_i$ of the color video signals being recorded. The output of frequency converter 67 is applied to a transformer 69 having a center-tapped secondary with two outputs + and − of opposite polarity at which frequency converting signals $+S_q$ and $-S_q$, respectively, appear. Such frequency converting signals $+S_q$ and $-S_q$ are of opposite phase or polarity and have the frequency $(f_i + 44f_H - \frac{1}{4}f_H)$. The frequency converting signals $+S_q$ and $-S_q$ are alternatively applied to the frequency converter 50 through a switching circuit 70. The latter is controlled by the control signal $S_x$ from the AND circuit 63 so that the frequency-converting signal $+S_q$ is applied to the converter 50 whenever the control signal $S_x$ has a low value, and the frequency-converting signal $-S_q$ is applied to converter 50 whenever the control signal $S_x$ has a high value. Frequency-converting signals $+S_q$ and $-S_q$ alternately applied to frequancy converter 50 are effective in the latter to convert the carrier of the chrominance component from its original carrier frequency $f_i$ to a relatively lower carrier frequency $f_c = 44f_H - \frac{1}{4}f_H$. As a result of the foregoing, the frequency-converted chrominance component $S_j$ applied from frequency converter 50 through the filter 51 to mixing circuit 44 has a frequency band lower than that of the frequency-modulated luminance component $Y'_{FM}$. During intervals when frequency converting signal $-S_q$ is applied to the frequency converter 50, the polarity or phase of the carrier of the frequency-converted chrominance component $S_j$ is reversed as compared with the phase or polarity of such carrier during the interval when the frequency converting signal $+S_q$ is applied to frequency converter 50.

It will also be noted that the carrier frequency $f_c$ of the frequency converted chrominance component $S_j$ satisfies the equation:

$$f_c = \tfrac{1}{4}f_H(2m-1) \tag{8}$$

in which m is a whole positive integer. In the present case, in which $f_c = 44f_H - \frac{1}{4}f_H$, the value m in Eq. (8) is 88.

As a result of the described selection of the carrier frequency of the frequency-converted chrominance component $S_j$, the second harmonic of the carrier of the frequency converted chrominance component is interleaved with the luminance component so as to avoid beat interference therebetween. By avoiding such beat interference, the frequency-converted chrominance component can be recorded with a relatively high amplitude in comparison to the amplitude of the frequency-modulated luminance component for obtaining a good signal-to-noise (S/N) ratio of the chrominance component, as described in detail in U.S. Pat. No. 3,730,983.

The frequency-converted chrominance component $S_j$ and the frequency-modulated luminance component $Y'_{FM}$ are combined in the mixing circuit 44 with the frequency-converted chrominance component amplitude-modulating the frequency-modulated luminance component to provide the combined or composite signal $S_c$. The latter is applied throug the amplifier 17 and the record-playback switch RP₂, in the recording position of the latter, to the transducers 22 for recording in the successive parallel tracks on the tape 23.

The speed of rotation of a motor 71 for driving a capstan 72 is controlled by a servo circuit 73 which receives a control voltage $E_c$.

The record-playback switches RP₁–RP₄ are ganged or interconnected so as to be simultaneously changed-over from their recording positions shown in FIG. 8 to their reproducing, or playback, positions in which the movable contact of each of the enumerated switches engages a respective playback contact P. In the reproducing or playback section of the apparatus, the playback terminal P of the switch RP₂ is connected to a high pass filter 74 and a low pass filter 75 so as to apply to such filters the signals being alternately reproduced by the transducers 22 from successive parallel tracks on the tape 23. The filters 74 and 75 respectively separate the frequency-modulated luminance component $Y'_{FM}$ and the frequency-converted chrominance component $S_j$ from the reproduced signals. The frequency-modulated luminance component $Y'_{FM}$ separated from the reproduced signals is passed through an amplifier 31 and a limiter 32 to a frequency demodulator 33 so as to obtain a demodulated luminance component $S'_Y$.

Since the frequency modulated luminance component $Y'_{FM}$ has had its carrier frequency shifted by $\frac{1}{2}f_H$ for recording in successive tracks on the tape 23 the demodulated luminance component $S'_Y$ from the demodulator 33 is applied directly to a DC level corrector or compensator 76 controlled by the control signal $S_r$ fron the flip-flop 46 so as to eliminate from the demodulated luminance component the DC level variation corresponding to the $\frac{1}{2}f_H$ frequency difference between the carriers of the frequency modulated luminance component as recorded in the next adjacent tracks. The D-C level-compensated luminance component is passed through a signal processing circuit 77, which includes the expander circuit 34 or 41 and the linear de-emphasis circuit 35, to an input of an adding or mixing circuit 78. It is assumed that, by reason of the DC level compensation in circuit 76, the luminance component, after non-linear de-emphasis in circuit 77, will have its sync tip level restored to the sync tip level of the original video signals and will have the original difference between its sync tip and white levels.

The frequency-converted chrominance component $S_j$ separated from the reproduced signals by the filter 75 is appled through an automatic color control circuit 79 to a frequency reconverter 80, which alternately receives the frequency converting signals $+S_q$ and $-S_q$ from switching circuit 70, and by which the carrier of the reproduced chrominance component $S_j$ is reconverted to the original carrier frequency $f_i$. The resulting frequency-reconverted chrominance component $S'_i$ is passed through a comb filter 81 in which, as described hereinafter, chrominance components of cross-talk signals are cancelled or suppressed so that only the chrominance component $C_s$ of the video signals being reproduced from a particular track on the tape 23 by one of the transducers is passed through an amplifier 82 to the mixing circuit 78 for combining in the latter with the luminance component $S_y$ and thereby forming the desired reproduced video signals appled to an output terminal 83.

The output of comb filter 81 is also shown to be supplied through an amplifier 84 to a burst gate 85 that extracts burst signals from the reconverted chrominance signal components $S'_i$ and applies the extracted burst signals to one input of a phase comparator 86. An oscillator 87 provides an output at the standard or original carrier frequency $f_i$ for the chrominance component, and such output is appled to a second input of the comparator 86. The output of the phase comparator 86 is connected to a playback terminal P of a switch $RP_5$ which is also ganged or interconnected with the record-playback switches $RP_1$–$RP_4$ so as to be effective, in the playback mode of operation, to apply the output of the phase comparator 86 as a control voltage to the voltage-controlled oscillator 68. Any phase difference between the burst signals extracted by the gate 85 from the recovered chrominance component and the output of the oscillator 87 causes the comparator 86 to apply a suitable control voltage to the voltage-controlled oscillator 68 to effect a required change in the phase of the converting signals $+S_q$ and $-S_q$ so as to achieve an automatic phase control function for eliminating so-called jitter from a picture or image produced by a cathode ray tube in response to color cideo signals obtained at the output terminal 83.

In the playback mode of operation, the control signal $S_x$ for operating the switching circuit 70 is again obtained from the AND circuit 63 in response to the control signals $S_r$ and $S_h$ from the flip-flops 46 and 62. However, in this mode, the reproduced video signals from the mixing circuit 78 are applied through contact P of the record-playback switch $RP_1$ to the vertical and horizontal synchronizing signal separating circuits 45 and 61 so that the flip-flops 46 and 62 are respectively triggered by the vertical and horizontal synchronizing signals separated from the reproduced color video signals. Further, in the playback mode, the fixed head 53 reproduces the recorded control signals that distinguish the tracks on which the carrier frequency in the modulator 16 is shifted from those in which it is not. The control signals reproduced by the head 53 are applied to one input of the phase comparator 54 through contact P of the record-playback switch $RP_3$, an amplifier 88 and contact P of the record-playback switch $RP_4$. The other input terminal of the phase comparator 50, as before, receives the rotation indicating pulses from the generator 55 so that the phase comparator 54 applies a suitable control signal through the amplifier 57 to the servo circuit 58 for causing the brake 59 to control the rotation of the transducers 22 by the motot 60. The described servo control arrangement is effective, in the reproducing mode of operation, to insure that each of the tracks on the tape 23 will be scanned by the same one of the transducers 22 that was employed for recording video signals in such track.

The above described recording and reproducing apparatus operates as follows.

RECORDING MODE OF OPERATION

During recording, the operation of the frequency shifting circuit 47 is controlled by the control signal $S_r$ from the flip-flop 46 so as to establish the desired difference of $\frac{1}{2}f_H$ between the carrier frequencies with which the frequency-modulated luminance component $Y'_{FM}$ is recorded in alternating tracks on the tape 23. The frequency-modulated luminance component $Y'_{FM}$ of the composite or combined signal $S_c$, as recorded by transducers 22 in track which are next adjacent to each other on the tape 23, have different carrier frequencies which are in frequency interleaving relation to each other.

Further, during recording, the chrominance component $S_i$ separated from the incoming color video signals and having the original or standard carrier frequency $f_i$ is acted upon in the frequency converter 50 by the frequency-converting signal $+S_q$ or $-S_q$ to provide the frequency converted chrominance components $S_j$ in a lower band than that of the frequency-modulated luminance component $Y'_{FM}$ with which it is combined in the mixing circuit 44 to constitute the composite or combined signal $S_c$ alternately recorded by the transducers 22 in successive tracks on the tape 23. The alternative application of frequency converting signals $+S_q$ and $-S_q$ to the frequency converter 50 is determined by the switching circuit 70 controlled by the signal $S_x$ from the AND circuit 63. Since the frequency-converting signals $+S_q$ and $-S_q$ are of opposite phase or polarity, their effect in the frequency converter 50 will be to provide the resulting frequency converted chrominance component $S_j$ with respective carriers $C_a$ and $-C_a$ which are similarly of opposite phase or polarity. By reason of the previously described configuration of the control signal $S_x$, during each field interval recorded by one of the transducers 22, the converting signal $+S_q$ is continuously applied to the frequency converter 50 with the result that the successive line intervals of each field interval recorded by that transducer in alternate tracks on the tape 23 are provided with a carrier of the same polarity. On the other hand, during successive line intervals of each field interval recorded by the other transducer 22 in the remaining alternate tracks, the frequency converting signals $+S_q$ and $-S_q$ are alternately applied to the frequency converter 50 so that the successive line intervals of each field interval recorded by the latter transducer are alternately recorded with the carriers $C_a$ and $-C_a$ of opposed polarity.

REPRODUCING MODE OF OPERATION

During playback, or reproducing operation, signals reproduced alternately by the transducers 22 from successive tracks on the tape 23 are applied through the switch $RP_2$ to the filters 74 and 75 that respectively separate the frequency modulated luminance component $Y'_{FM}$ and the frequency converted chrominance component $S_j$ from the reproduced signals. Rotation of the transducers 22 is regulated by comparison of the control signals reproduced from the tape by the fixed head 53 with the rotation-indicating signals from the generator 55, so that the signals recorded on the tape 23 by one of the transducers 22 will be reproduced by the same transducer. As a result of such servo control of the rotation of the transducers during playback the control signal $S_r$ that controls the DC level-correcting circuit 71, and the control signal $S_x$ from the AND circuit 63 that controls the switching circuit 70 have the same relationships to the operative positioning of transducers 22 as they have during the recording operation.

The frequency modulated luminance component $Y'_{FM}$ separated from the reproduced signals is demodulated in the frequency demodulator 33 so as to obtain the demodulated luminance component $S'_Y$ which will have changes in the level thereof corresponding to the different carrier frequencies with which the frequency-modulated luminance component $Y'_{FM}$ was recorded in adjacent tracks on the tape 23. However, by reason of the control signal $S_r$ applied to the DC level compensating or correcting circuit 76, the latter will eliminate such changes in level of the demodulated luminance component applied through the non-linear de-emphasizing circuit 77 to the mixing circuit 78. During playback, the interfering signal due to cross-talk in respect to the luminance component of the video signals is eliminated partly be reason of the fact that the frequency-modulated luminance component is recorded with different carrier frequencies in the adjacent tracks, which carrier frequencies differ from each other by $(m+\frac{1}{2})F_H$. Thus, when, for example, one of the transducers 22 is scanning a track, the frequency-modulated luminance component reproduced from that track, that is, the main luminance component, and the frequency-modulated cross-talk luminance component simultaneously reproduced by the same transducer from an adjacent track will have respective carrier frequencies that differ by $(m+\frac{1}{2})f_H$. Thus, the interfering signal due to the cross-talk luminance component is in frequency-interleaving relation to the frequency of the main reproduced luminance component. When the frequency-modulated luminance component separated from the reproduced signals is demodulated in the frequency demodulator 33, the demodulated luminance component $S'_Y$ will include the desired luminance component and also the interfering signal having the frequency $(m+\frac{1}{2})f_H$ with the result that the interfering or noise signal will be inverted in phase in successive horizontal intervals of the video signals. When the reproduced video signals at the output terminal 83 are applied to a cathode ray tube, the interfering signal due to luminance component cross-talk will tend to be visually cancelled on the screen of the cathode ray tube.

Considering the frequency-converted chrominance component, it should be noted that the effect of providing the same carriers $C_a$, $-C_a$ of reversed phase or polarity in successive line intervals or areas of each track recorded by the transducers 22 is to provide a new carrier $C_b$ having frequency components offset by $\frac{1}{2}f_H$, or interleaving, with respect to the frequency components of the carrier $C_a$ with which the frequency converted chrominance component is recorded in the next adjacent track. as described in detail in U.S. Pat. No. 3,925,810.

Accordingly, in the playback operation, when one of the transducers 22 scans a track on the tape 23 for reproducing the frequency-converted chrominance component recorded therein with the carrier $C_a$, the undesired, or cross-talk, signal simultaneously reproduced from the next adjacent track has the carrier frequency of its frequency-converted chrominance component in frequency interleaving reltion to the carrier $C_a$.

During playback the switching circuit 70 is again controlled by the control signal $S_x$ from the AND circuit 63 so that the frequency reconverter 80 continuously receives the appropriate frequency converting signal $+S_q$ or $-S_q$ during the scanning of the tracks by the transducers 22. As a result, during the scanning of a track by one of the transducers 22, the frequency reconverter 80 reconverts the frequency of the carrier $C_a$ of the chrominance component then being reproduced to the original or standard carrier frequency $f_i$, while the frequency of the carrier of the cross-talk chrominance component is similarly shifted so as to be spaced midway between the principal side bands of the desired carrier. Similarly, during the scanning of a track by the other transducer 22, the frequency converter 80 converts the frequency of the carrier $C_b$ of the chrominance component then being reproduced to the original or standard frequency $f_i$, while the carrier of the cross-talk chrominance component then being reproduced has its frequency similarly shifted so as to be spaced midway between the principal side bands of the desired reconverted carrier. Thus, the reconverted carriers of the chrominance component reproduced during alternate field intervals both have the same carrier frequency $f_i$, while the chrominance component of the undesired or cross-talk signal is, in each case, spaced midway between the principal side bands of the desired carrier and can be eliminated by the comb filter 81 to yield the desired reconverted chrominance component $C_s$ free of any cross-talk chrominance component.

Although illustrative embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A video signal processing circuit comprising
   an input terminal to which a video signal is applied;
   emphasizing means having an input connected to said input terminal and an output providing an emphasized signal in which at least a portion of said video signal is emphasized;

control means connected to said emphasizing means to control the magnitude of the emphasized signal, said control means including a voltage source having first and second voltage output terminals, non-linear impedance means connected to a point of reference potential and having a relatively high impedance when said emphasized signal is between a first, relatively low value and a second value higher than said first value, said impedance means having a relatively low impedance when said emphasized signal is below said first value or above said second value, and a capacitor connecting said non-linear impedance means to said output of said emphasizing means, said non-linear impedance means including a first uni-directionally conductive semiconductor device connected in series between said capacitor and said first voltage output terminal of said voltage source and a second uni-directionally conductive semiconductor device connected in series between said capacitor and said second voltage output terminal of said voltage source;

a constant current source connected to said second voltage output terminal and polarized to conduct output current from said second voltage output terminal;

a resistor connected between said first and second voltage output terminals; and another capacitor connected in parallel with said resistor to provide a low AC impedance between said first and second voltage output terminals, the voltage across said resistor determining the difference in the output voltages at said first and second voltage output terminals.

2. A video signal processing circuit comprising
an input terminal to which a video signal is supplied;
an output terminal from which a pre-emphasis video signal is derived;
a signal amplifying device having an input electrode and first and second current-carrying electrodes;
first means to connect said input electrode to said input terminal;
resistive means connected to said first current-carrying electrode;
non-linear frequency-response compensation means connected in parallel with said resistive means and comprising a capacitor and first and second oppositely polarized diodes connected in parallel with each other, each of said diodes being connected in series with said capacitor to modify the amplitude of high frequency components of large amplitude of said video input signal differently from the amplitude of small amplitude components of said video input signal amplified by said amplifying device;
a constant current circuit;
a second resistor connected in series with said constant current circuit so that a constant voltage is developed across said second resistor by the constant current provided thereto, said diodes constituting a series diode circuit connected across said second resistor and polarized to be non-conductive to the voltage across said second resistor; and
a second capacitor connected in parallel with said second resistor and having a low impedance to said video signals in comparison with the impedance of said second resistor.

3. A video signal processing circuit according to claim 2, in which said constant current circuit includes
a constant current transistor having a collector, an emitter, and a base with said emitter thereof being connected to a junction formed by said second diode and said second resistor;
a third resistor connected between the emitter of said constant current transistor and a point reference potential; and
a base bias source connected to the base of said constant current transistor.

4. A video signal processing circuit according to claim 3 in which the resistance of said second resistor is twice as great as the resistance of said third resistor.

5. A video signal processing circuit according to claim 2 comprising, in addition, a frequency modulator connected to said amplifying device to derive non-linearly pre-emphasized signals therefrom to modulate the frequency of a carrier therewith to produce a frequency-modulated signal.

6. A video signal processing circuit according to claim 5, in which said video signal is the luminance component of a color video signal that also comprises a chrominance component, said video signal processing circuit further comprising
means for frequency converting said chrominance component to a lower frequency band than that of the frequency-modulated signal; and
means for combining the frequency-converted chrominance component with the frequency modulated signal to provide a composite signal for recording on the record medium.

7. A video signal processing circuit according to claim 6 in which said chrominance component has an original chrominance carrier frequency, and in which said means for frequency-converting said chrominance component includes a frequency converter receiving said chrominance component with said original chrominance carrier frequency thereof, and means for producing a frequency-converting signal supplied to said frequency converter to cause the latter to convert said original chrominance carrier frequency to a relatively lower chrominance frequency.

8. A video signal processing circuit according to claim 7 in which said original and relatively lower chrominance carrier frequency of the chrominance component are in frequency-interleaving relation with respect to each other and to the horizontal synchronizing signal frequency of the video signal.

9. A video signal processing circuit according to claim 8 in which said relatively lower chrominance carrier frequency has its second harmonic in frequency-interleaving relation with respect to said horizontal synchronizing signal frequency of the video signals.

10. A video signal processing circuit according to claim 9 in which said relatively lower chrominance carrier frequency of the frequency converted chrominance component is selected to satisfy the following equation:

$$f_c = \tfrac{1}{4} f_H (2m-1)$$

in which $f_c$ is said relatively lower chrominance carrier frequency, $f_H$ is said horizontal synchronizing signal frequency of the video signals, and m is a whole positive integer.

11. A video signal processing circuit according to claim 5 in which said video signals are the luminance component of color video signals which further have a chrominance component and which are divided into field intervals and predetermined numbers of line intervals included in each field interval to be recorded in respective areas of said successive parallel tracks of a recording medium, said processing circuit further comprising
means for providing different first and second carriers for said chrominance component;
carrier selecting means for alternatively selecting first and second chrominance carriers for said chrominance component to be recorded in the tracks; and
control means for the carrier selecting means operative to cause the recording of said chrominance component with the first and second chrominance carriers therefor, respectively, in said tracks which are next adjacent each other.

12. A video signal processing circuit according to claim 11 in which said first and second chrominance carriers for the chrominance component have different polarity characteristics.

13. A video signal processing circuit according to claim 12 in which the polarity of said first chrominance carrier for the chrominance component is constant during successive line intervals of the video signals being recorded in one of the tracks, and the polarity of the second chrominance carrier for the chrominance component is reversed after each predetermined number of said line intervals of the video signals being recorded in the next adjacent track.

14. A video signal processing circuit comprising an input terminal to which a video signal is applied; emphasizing means to emphasize at least a portion of said video signal including a transistor amplifier having a base electrode connected to said input terminal and first and second current-carrying electrodes, circuit means connected in series with said first current-carrying electrode to modify the frequency response to said transistor amplifier, and a resistive load connected with said second current-carrying electrode; and control means to control the magnitude of the emphasized signal including a capacitor connected to said second current-carrying electrode and a non-linear impedance connected with said capacitor to form a series circuit which is in parallel with said resistive load, said non-linear impedance including a voltage source providing a relatively fixed voltage, a first diode coupled between said capacitor and said voltage source and biased to be normally nonconductive except in response to excessive first signal excursions of one polarity, a constant current circuit, a voltage-drop resistor connected between said voltage source and said constant current circuit and defining a junction between the latter and the voltage-drop resistor, a second diode connected to said junction and polarized to be normally non-conductive except in response to excessive signal excursions of the opposite polarity to that of said first signal excursions, and an additional capacitor connected in parallel with said voltage-drop resistor and having a low impedance for said video signal.

15. A video signal processing circuit according to claim 14, in which said constant current circuit includes
a constant-current transistor having a control electrode and current-carrying electrodes, one of said current-carrying electrodes being connected to said voltage-drop resistor,
a constant-current load resistance connected between another of said current-carrying electrodes and a point of reference potential, and
a biasing source connected to said control electrode of the constant current transistor.

16. A video signal processing circuit according to claim 15, in which the value of said voltage-drop resistor is approximately double that of said load resistance.

17. A video signal processing circuit according to claim 14, wherein the control electrode of the constant-current transistor is a base electrode, the first-mentioned current carrying electrode thereof is a collector electrode, and the second-mentioned current-carrying electrode thereof is an emitter electrode.

18. A video signal processing circuit according to claim 14, wherein said transistor amplifier has, as its current-carrying electrodes, an emitter and a collector, and, for performing a preemphasis of said video signal, said transistor amplifier is arranged so that said first current-carrying electrode is the emitter and said second current-carrying electrode is the collector.

19. A video signal processing circuit according to claim 14, wherein said transistor amplifier has, as its current-carrying electrodes, an emitter and a collector, and, for performing a deemphasis of a preemphasized video signal, said transistor amplifier is arranged so that said first current-carrying electrode is the collector and said second current-carrying electrode is the emitter.

* * * * *